United States Patent
Rizzuto, Jr.

(10) Patent No.: US 7,994,426 B1
(45) Date of Patent: *Aug. 9, 2011

(54) SLACK CABLE ARRANGEMENT FOR UNDERGROUND ELECTRIC SERVICE CONDUIT CONNECTED TO SERVICE BOXES ON THE SIDES OF BUILDINGS

(76) Inventor: Salvatore A. Rizzuto, Jr., Emmaus, PA (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/217,128

(22) Filed: Jul. 1, 2008

Related U.S. Application Data

(63) Continuation-in-part of application No. 11/149,963, filed on Jun. 10, 2005, now Pat. No. 7,394,023.

(60) Provisional application No. 60/578,749, filed on Jun. 10, 2004.

(51) Int. Cl.
 *H01R 4/00* (2006.01)
(52) U.S. Cl. ......................................................... 174/92
(58) Field of Classification Search ................. 174/70 R, 174/70 A, 71 R, 72 R, 74 R, 75 R, 79, 84 R, 174/88 R, 92, 38, 39
See application file for complete search history.

(56) References Cited

U.S. PATENT DOCUMENTS

| | | | | |
|---|---|---|---|---|
| 3,147,337 A | * | 9/1964 | Chennell | 174/72 R |
| 3,473,339 A | * | 10/1969 | Schlafly, Jr. | 405/157 |
| 3,769,443 A | * | 10/1973 | Pierzchala et al. | 174/38 |
| 3,961,229 A | * | 6/1976 | Splitt | 361/641 |
| 4,579,403 A | * | 4/1986 | Byrne | 439/33 |
| 4,884,863 A | * | 12/1989 | Throckmorton | 385/135 |
| 5,121,458 A | * | 6/1992 | Nilsson et al. | 385/100 |
| 6,766,094 B2 | * | 7/2004 | Smith et al. | 385/135 |
| 6,807,355 B2 | * | 10/2004 | Dofher | 385/134 |

FOREIGN PATENT DOCUMENTS

| | | | |
|---|---|---|---|
| JP | 2001-042134 | * | 2/2001 |
| JP | 2001-296432 | * | 10/2001 |

* cited by examiner

*Primary Examiner* — William H Mayo, III
(74) *Attorney, Agent, or Firm* — Charles A. Wilkinson; Clinton H. Wilkinson

(57) ABSTRACT

An improved underground slack chamber in a form which will extendably retain a loop of electrical service cable ready to pay out slack in the event of ground subsidence is provided with improved means to stabilize the position of the slack chamber while inserting cable within the chamber and thereafter either in line with an underground cable run or partially buried in line with an improved service line arrangement from the building service downwardly to an underground service line.

15 Claims, 5 Drawing Sheets

SLACK CABLE ARRANGEMENT FOR UNDERGROUND ELECTRIC SERVICE CONDUIT CONNECTED TO SERVICE BOXES ON THE SIDES OF BUILDINGS

CROSS REFERENCE TO RELATED APPLICATION

This application is a Continuation-In-Part Application based upon and taking priority from U.S. patent application Ser. No. 11/149,963, filed on Jun. 10, 2005 and assigned U.S. Pat. No. 7,394,023 which was based upon and took priority from U.S. Provisional Pat. Appl. No. 60/578,749 filed on Jun. 10, 2004.

BACKGROUND OF THE INVENTION

1. Field of the Invention

This invention pertains to electrical service conduits extending from buried or underground service lines to individual electrical service installations comprised of buildings requiring power and more particularly to providing means for protection of the building electric service from damage and possible interruption as a result of ground subsidence or other disturbance in the area of the underground electrical service lines. More particularly still the invention pertains to a slack provision arrangement to provide additional service cable to allow for any additional length of service line necessary to relieve tension on the service attached to a building induced by ground level alterations.

2. Preliminary Discussion

In the connection of underground electric service to building structures, difficulty has been encountered with settling of backfill over buried electrical conduits on building sites. It is not unusual for such backfill to settle several feet or more along with the conduits surrounding the service. Such settlement can initially be at a fairly high rate of several inches or more per month particularly during periods of high rainfall. The force of such settlement is transferred to the conduit and the electrical service wires where they are connected to the electrical service box on the exterior of the building. Even if the service wires are not broken or disconnected by the resulting tension exerted on them, sections of the protective conduit around the service wires are frequently pulled apart or away from each other or from the service box, exposing the service wires and sometimes even pulling the building service box away from its anchoring or even breaking away portions of the building structure to which the service extends. Exposure of the service conduit or wires is not only dangerous because of the danger of severe shock by anyone coming in contact with the service wires or conduit, but constitutes a fire hazard due to possible ignition of surrounding materials in case of breaking and exposure of the wires.

This problem was recognized in U.S. Pat. No. 4,981,942 issued to T. F. Moran, Jr. on Aug. 29, 1989, entitled "Adjustable Riser Assembly", which discloses an adjustable length conduit for protecting underground electrical power service wires between the ground and an exterior above ground service box. Such prior art riser assembly is comprised of a first lower conduit section the lower end of which extends into the ground and has a bend of at least 30° on such end, and a second rigid conduit which connects to the service box on one end and has a larger overall diameter along its lower end so as to slidingly receive the upper end of the lower conduit section. A very close tolerance is provided between the outer diameter of the lower conduit section and the inner diameter of the upper conduit section, with such diameters being substantially the same so that at least partial sealing between the two diameter conduits is effected. The two conduits overlap and allow for subsidence of the ground surface in new construction while maintaining a substantially sealed conduit protection of the electrical service wires between the service box and the ground. Such continued protection is important not only to prevent children or others from gaining access to and possible experiencing injury from the charged service wires, but also to keep insects and small animals out of the service box and building and to prevent the service box in an extreme but not uncommon case from being bodily ripped from its position on the wall. The Moran Jr. invention therefore addressed a very serious consequence of backfill settlement in building construction.

There are several problems, however, with the Moran, Jr. riser protection assembly which make it in practice impractical and difficult to use and install. First, the close sliding fitting or tolerance between the conduits does not allow for any lateral or side to side movement of the lower conduit with respect to the upper conduit. Thus, if the lower conduit is not installed so that it is exactly aligned with the upper conduit, the outer edge of the lower conduit will press against the inner side of the upper conduit and will not slide easily or possibly even at all due to frictional forces between the conduits. This makes the Moran, Jr. protective assembly very difficult to hook up, or install, since, in most cases, it is difficult and time consuming to install the conduits so that they are exactly aligned. Furthermore, just as settling forces may cause downward strain on a nonadjustable conduit, such forces may also place significant lateral pressure on the below ground portion of the adjustable conduit which may in itself exert sufficient force to loosen the conduit from the wall. Yet another problem with the Moran, Jr. assembly is that if the upper slightly larger conduit and the lower smaller conduit are not exactly aligned, when the smaller enters into the larger it can be inserted only a minimal distance before its edge begins to severely impact the inside of the larger pipe and refuses to slide farther without displacing the larger conduit which may be already secured to the wall when the electric lines are installed. Consequently, the lower small conduit is extremely difficult to install or insert into the larger upper conduit again primarily due to the close fit or tolerance between the upper and lower conduits.

The present inventor recognized the disadvantages of known sliding or slip joint type devices, and conceived of a new assembly that overcomes all of such disadvantages. In particular, the present inventor solved the problem of the lateral stress placed on the sliding portions of the conduits by using a larger inside diameter conduit assembly or fitting as the outer conduit plus placing a deformable sealing ring at the end of such fitting between the conduits. The deformable sealing ring is secured to the inner diameter on the lower end of the assembly, so that the section of conduit that extends into the ground will connect with such assembly with a close fit between it and the sealing ring, rather than with the inner diameter of the assembly or fitting itself. The improved slip-joint provided is described and claimed in applicant's prior application Ser. No. 11/098,860.

In addition, the prior patented invention did not address the possibility that subsidence of the ground or backfill might stress the underground electrical service conductor or cable itself and possibly pull it loose from its connections and the present inventor therefore provided an improvement in the basic sliding coupling in the top to provide an additional length of wire conduit to allow for slack therein to allow for the extra conduit that may be necessary to provide a continuous length of cable between the service connection and the power line connection at the street in case of settlement with additional inevitable lengthening of the path which a cable must follow in its path from a service box on a building to a service connection at the street. This allowed additional service cable to be paid out from the storage in the upper portion of the connecting slide fitting to allow for the lengthening of the conduit and tension of the electric cable itself.

However, it has now been found that providing a slack reservoir in the upper end of the slide fitting providing additional extension for the conduit attached to the building may not always be sufficient and that a more easily paid out length of excess cable may be desirable more in line with the underground section of the main run underground of the cable from the building to the street service. The present applicant has supplied such a slack arrangement in accordance with the present invention by providing a slack receptacle or container adapted to contain an underground loop or loops of electrical conduit which are automatically paid out upon the application of tension upon the electric cable caused by subsidence of backfill or the like. The container or receptacle may be constructed of polyvinylchloride, the approved material for service cable conduits because of its weather resistance and fire resistance in case the wires or electrical conduit is short-circuited in contact with it. However, sine there is little danger of fire underground, other structural plastics may be used. The slack cable or conduit within the receptacle or box is easily available and is placed in the receptacle through a door or cover and will be adapted to contain at least one full loop of wire, cable or conduit arranged to be easily paid out in either direction from the receptacle in case of need due to subsidence or any other severe tension on the electrical service. Since the receptacle is buried or arranged in line with the electrical service it is arranged to easily pay out cable or conduit in either or both directions upon tension being exerted upon the cable tension loop within, thereby preventing any accumulation of tension, due especially to subsidence, from tensioning the electrical service box or the service to the street and possibly detaching or breaking the wires or even pulling the entire service from the wall of the building to which it is connected. The slack receptacle should be strong enough to withstand the weight of earth over it, plus the possible weight of machinery and vehicles passing over the surface of the earth fill over it and is preferably at least somewhat impervious to the silt laden water percolating around it. While moisture entering the slack receptacle will not usually be deleterious to the electrical conduit or cable, which is designed for underground service in any event, the collection of silt within the slack receptacle can cause any cable loop therein to become substantially immobile and prevent it from being able to pass the slack in the cable from the receptacle. See, however, the further discussion hereinafter.

The usual underground cable run will be provided on the sides and preferably the top with so-called "screening" in the form of a layer of small broken rock to protect the cable and conduit from deleterious underground movements and influences including mud and silt flows. However, such screening may not be sufficient to prevent the passage of very fine silt particles. While larger clastic or divided materials will be excluded by such broken rock screening, fine silt and the like may still percolate through the screen and upon entrance in the slack receptacle settle in the center of a coil of wire or cable and possibly effectively resist the contraction of said coil or cable, thereby resisting payout of the coil and the relief of tension caused by earth subsidence. This, however, depends also upon how much flow of moisture is likely to occur through the slack chamber and if the chamber is carefully designed to limit such flow no serious consequences may result.

The primary focus of this invention, therefore, is the provision of a sturdy damage proof containment suitable for the containment of at least and in fact preferably one large loop of electrical service wire from which wire or service cable can be paid out simply and reliably to provide extra slack to prevent serious electrical service tension on a wire service and into which containment means the electrical service cable can be conveniently strung when installing the electrical service. It is preferred as noted above that only a single large loop be used.

Several embodiments of the invention can be used dependent upon the local utility custom respecting the laying of conduit to the street service, i.e. whether conduit is laid only from underground upwardly to the building service with the remainder of the run to the street service being without conduit protection, this being referred to as direct burial or whether protective conduit surrounds the electrical cable all the way to the street service referred to as non-direct burial.

3. Description of Related Art

U.S. Pat. No. 4,006,289 issued to N. P. Roe et al. on Feb. 1, 1977, entitled "Electromechanical Cable Deployable in a No-Torque Condition, and Method," discloses a method and means for winding cable torque free in a coil placing one full twist in the coil with each winding so that when removing the cable from the coil it is presented without twist. The cable can be wound on a reel or into an open container. There appears to be no disclosure of the coil as a supply of cable for pay out to relieve tension, however.

U.S. Pat. No. 4,579,403 issued to N. R. Bryne on Apr. 1, 1986, entitled "Electrical Junction Assembly with Adjustable Connectors," discloses in FIGS. 3 through 8 a slack cable containing chamber for paying out extra cable to be used in revamping of office furniture arrangements rather than having to install all new wiring. The structure actually shown would appear to provide only a relatively small amount of slack cable and the structure while appearing fairly sturdy, is not intended at all for underground usage.

U.S. Pat. No. 4,864,080 issued to H. P. Fochler et al. on Sep. 5, 1989, entitled "Terminator Connector Fitting for Electrical Box and Conduit System," broadly discloses the use of a connector box for electrical fitting, but does not disclose an arrangement for coiling extra cable in a fitting below ground level to provide slack to relieve tension on the cable in the case of ground subsidence.

U.S. Pat. No. 4,844,863 issued to R. A. Throckmorton on Dec. 5, 1989, entitled "Optical Fiber Splicing Enclosure for Installation in Pedestals," discloses an improvement in copper chambers sometimes used in former times to provide excess communication cable at the surface or above ground level to allow for splicing of new communication lines. The Throckmorton invention adopts such above ground structures by incorporating a curved holder for storing fiber optic cable with curvatures greater than the so-called critical bend radius beyond which the walls of fiber optic cable will not transmit electromagnetic radiation.

U.S. Pat. No. 6,031,180 issued to R. J. Schilling et al. on Feb. 29, 2000, entitled "Below Ground Pressurizable Cable Interconnect Enclosure," discloses a specialized below ground interconnect chamber for electrical cable. The chamber is formed from plasticized concrete and is provided with internal environmental gases and is attached to PVC conduit. The cable connection chamber is designed to be useful for various interconnect purposes.

U.S. Pat. No. 6,181,861 issued to W. Wenski et al. on Jan. 30, 2001, entitled "Arrangement for Branching a Telecommunications Cable Containing Several Stranded Elements with Optical Fibers," discloses a below ground chamber in which a number of fiberoptic cables can be stored in individual plastic cassettes or tubes and from which when a new connection to a local customer is to be made one or more of the fiberoptic cables or strands can be paid out to the customer from coiled fiberoptic strands stored in cassettes in the below ground chamber.

U.S. Pat. No. 6,526,858 issued to K. J. Smith et al. on Mar. 4, 2003, entitled "Cable Breakaway Assembly," discloses an alternative way of preventing excessive tension on communication lines including a knife severing arrangement to sever the lines when excessive tension on a line occurs.

U.S. Pat. No. 6,646,854 issued to W. J. Fowler et al. on Nov. 11, 2003, entitled "Lightning Suppression Attenuator and System Employing Same," discloses an underground container in which a conductive strand is coiled surrounded by conductive grit. Preferably the chamber outside the coil is filled with a conductive steel grit. The interior of the chamber, being surrounded by conductive grit to draw off any charge from a lightening strike, the cable within is neither intended to nor would it be able to pay out any substantial amount of slack cable in case tension was applied to the cable.

U.S. Published Application No. 2002/0034369 on Mar. 21, 2002 to J. H. Forrester et al., entitled "Apparatus for Storing Surplus ADSS Cable," which is a CIP of several earlier applications previously issued discloses an adaptation of a presently popular arrangement for providing slack which can be paid out in overhead lines when required. The arrangement is designed for use in overhead lines and not for relieving tension on underground lines.

U.S. Published Application No. 2002/0172489 on Nov. 21, 2002 in the name of B. H. Daoud et al. entitled, "Fiber Splice Holder with Protected Slack Storage Feature," discloses a fiberoptic splice holder with a slack storage feature. The application explains that in fiber splice holders which keep various spliced fiberoptic fibers separated and prevent the fiberoptic element from being bent at too great an angle it is convenient to have slack provided right on the splice holder.

U.S. Published Application No. 2003/0123935 on Jul. 3, 2003 in the name of D. Dofher entitled, "Subsurface Fibre Optic Cable Network Installation," discloses a small junction box for fibre optic cable with at least one separable sidewall and sealing means for fibre optic cable entering from the side. The junction box is designed to fit into narrow subsurface openings. A wire loop may be on the outside to hold further loops of fibre optic cable.

Patent document EP0726478 to G. S. Cobb et al. published Aug. 14, 1996, entitled "Splice Holder Assembly for an Optical Fiber Cable Splice Closure," discloses a splice holder for a fiber optic cable in which slack loops of fiber optic cable can be loops in the bottom.

None of the prior art known to the applicant discloses a slack cable box or case adapted to be used in the manner of that of the present invention for containing electric service cable looped in a loose coil in a slack coil container adapted for burying at the end of an underground conduit and to provide cable slack in the event of ground or fill subsidence, which cable slack will allow for such ground subsidence and prevent severe tension from being applied to exterior service facilities on the wall of a building and further deigned to have cable simply and easily coiled manually into the slack container by personal laying the conduit in place.

OBJECTS OF THE INVENTION

It is a principal object of the invention to provide slack in underground electrical service lines for the express purpose of providing for ground subsidence particularly in backfill in new construction.

It is a still further object of the invention to provide a slack container formed of a fire resistant plastic material designed to store for pay out, if required, from a below ground location of deliberately stored coils of slack in the service line.

It is a still further object of the invention to provide an at least partially coiled supply of slack service line in an underground pay out chamber in a position to pay out a section of service cable upon need due to ground subsidence away from a fixed connection of such cable service to a building service.

It is a still further object of the invention to provide a rugged practical slack service cable storage container for underground burial.

It is a still further object of the invention to provide a storage container with sufficient strength to resist normal above ground loads including the weight of humans and small machinery without damage.

It is a still further object of the invention to provide a polymeric underground slack chamber especially adapted to provide slack cable to payout in case of subsidence of underground building service lines.

It is a still further object of the invention to provide a polymeric underground slack chamber especially adapted for easily receiving loops of service cable for later payout.

Further objects and advantages of the invention will become evident from careful review and consideration of the following description and appended drawings.

The present invention has solved the former serious problem of tension applied to service facilities on the side of a building where electric power enters the building when the electric service enters the building through underground conduit and the ground through which the conduit runs subsides significantly particularly due to the progressive settlement of fill in new construction, but also from other ground movement such as may be caused by earthquake or the like.

SUMMARY OF THE INVENTION

The present invention provides a method and means for storing easily paid out slack in an underground or occasionally other locations when tension is applied to such service by ground movement by providing a sturdy slack cable storage enclosure which is preferably buried in the ground with at least one coil of cable therein and leading on one end from the enclosure to the building service and on the other to the street service. The storage enclosure preferably is in the nature of a flattened degradation resistant enclosure closeable with a top lid or section and having opposed orifices on the sides through which the electrical service cable slack can be dispensed in either direction, although usually toward the building structure, since the settlement of fill is invariably downwardly away from the service, or service box on the structure.

DETAILED DESCRIPTION OF INVENTION

Figure 1:
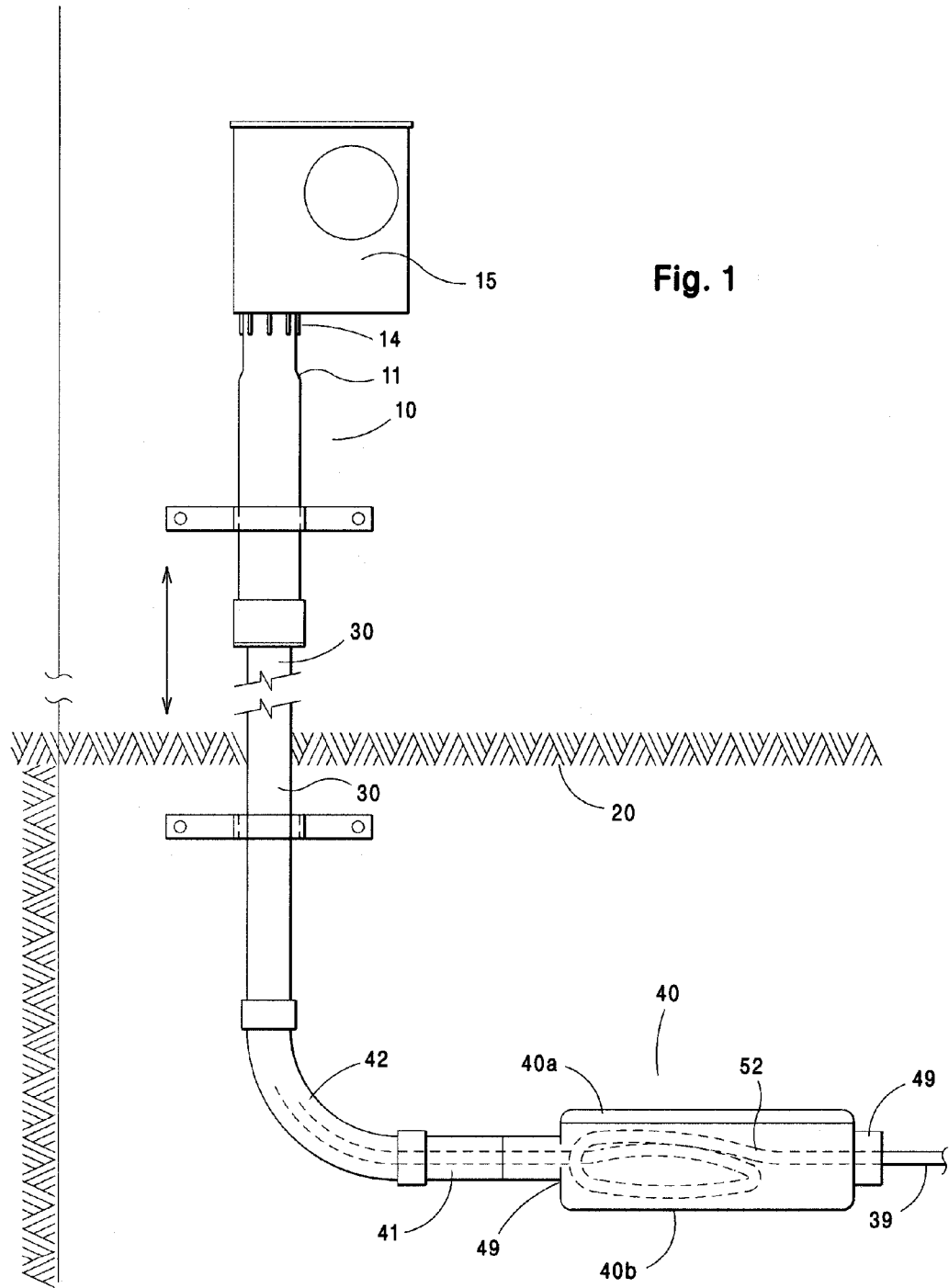
FIG. 1 is a sketch of the use of the slack receptacle of the invention in an installation of conduit attached to the wall of a building included along with use of the present Applicant's prior invention of a conduit slip joint upon a building wall.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Serious problems have been encountered in recent years with damage to the electrical service of building structures by subsidence of fill used to fill in the excavation usually made to contain the foundation and cellar of the building or even a partial foundation using heavy equipment. At one time in the fairly near past the necessary excavations for the foundations of residential and small business structures were made by hand tools and later by relatively small equipment and an attempt was made, because of the cost, not to excavate more than was strictly necessary. In such instances or times even in large developments the buildings usually conformed basically to the contour of the site. However, with the availability of larger earth moving equipment which can move considerably more earth at a time, more earth is moved just to provide access of the equipment to the excavation site and the site itself tends to be leveled to some common level as a matter of convenience. As a result, there tends to be overall more excavation and more filling and backfilling at completion so that there is more final backfill, which is seldom well consolidated and particularly in rainy seasons considerable more subsidence of the site as a whole and between individual buildings occurs. Since most modern developments have underground electrical service at least from the street service and such service is buried often largely in extensive fill, or completely while the building foundations are for practicality and stability constructed on or close to the lower level of excavation, when subsidence occurs such subsidence is of the underground service away from or downwardly with respect to the building. Subsidence of up to 6 inches is common and subsidence of several feet or more is not unusual. Thus, anything connected to the outside of the building and also at least partially situated in the fill is likely to be subject to disparate forces which in the case of underground electrical service can exert hundreds or even thousands of pounds of force upon the external switch box of the electrical service possibly severing or breaking the wires or pulling the external service box from its fastening and causing not only serious damage but becoming an electrical shock and fire hazard.

The present invention has solved the former serious problem of tension applied to electrical service facilities, i.e. the exterior box and associated wiring supported upon, or attached to, the wall of a building where such service is connected to the external service or feeder lines through buried electrical service or conduit extending from the street service. Such service can be basically of three types, (a) where a conduit containing the actual wires extends all the way from the street service, referred to as non-direct burial, (b) where the actual wires extend from the service box or building service through a conduit to the level of burial of the wires and the actual electric wires then extend from this point out to the street service without external conduit protection, referred to as direct burial, and (c) where the actual electric cable is protected with external conduit only to or slightly below the level of the ground or in some cases not protected at all, a somewhat older method of direct burial. The conduit, of course, serves not only to protect the cable from damage, but to protect parties who might otherwise come into contact with the cable and possible electrical charge in case of failure of the cable insulation. The problem of settlement of fill carrying with it and placing tension on the electrical service varies somewhat depending upon the characteristics of installation. In the case of a service cable extending all the way to the street service protected by conduit there will normally be some slack provided in the cable by a slight snaking of the cable from side to side in the conduit. However, the conduit will be pulled down with any settlement of fill and any slack will frequently be quickly exhausted or will be essentially unavailable toward the outer end of the conduit because of friction with the interior of the conduit. A service cable extending to the street service in contact with the surrounding ground material will be unable to straighten out upon tension being applied and as a result even more tension may be applied to the building service not infrequently breaking the wire, pulling connections apart or even pulling the service from the wall of the building. An external protective conduit having the usual 30 to 90 degree curve on the end furthermore will itself be carried down with subsidence of the ground and place tension on the building service. It is this type of tension on the conduit which the present applicant's previous invention of an improved slip-joint is designed to effectively remedy. However, while some embodiments of such improved slip-joint may embody cable storage or slack storage areas, such arrangement may not supply enough slack and may furthermore be difficult to effectively arrange sufficient slack in. To remedy this problem the present inventor developed the present independent slack chamber arrangement which is preferably itself buried in the line of cable to easily and simply provide slack electrical cable in case of subsidence of the ground level. The arrangement is effective and convenient and very easy to install and, where the electric cable is protected all the way to the street service by conduit or where conduit leads the electric service line into the ground and then by a curve at the lower end of the conduit directs the cable to the street service, will preferably be buried in line with the cable connected underground and at least on one side with the protective conduit. However, where the electric cable is only conducted to the ground level or thereabout with a protective conduit or does not even have a protective conduit, the slack chamber of the invention may be used in position turned at 90 degrees and partially buried directly under the building service without a slip-joint in the conduit.

As indicated, the cable used in underground service installations is rather stiff and heavy and it is difficult sometimes for linemen to wrestle it into a loop for placement in the underground slack chamber even though such service cable has usually only recently been in coiled form and then straightened out for use. Consequently, the service cable tends to change shape or expand once dropped into the bottom of the slack chamber from the top with its ends extending through the orifices in the two ends. Since as a matter of economy, the slack chamber is not made of thicker plastic material, i.e. it is preferably as a matter of economics not formed of thicker gauge material than is necessary to prevent three or four feet of overburden plus mechanical equipment such as tractors and small bulldozers and the like operating on top of that from collapsing the underground chamber and immobilizing the loop of strand therein, the force or pressure of expansion of a loop of cable upon the narrower sides of the chamber before being surrounded by fill can sometimes place enough stress in such walls to cause the walls of the lower portion of the slack chamber to be displaced sufficiently so that the top section of the slack chamber will not fit into or upon the lower section similarly to trying to fit the top on an overstuffed shoebox. It has been found by the present inventor, therefore, that it is desirable to reinforce particularly the long sides of the bottom of the chamber to resist the force of any expansion of the cable loop on the sides of the loop. Such reinforcement can be effected in several possible manners including the thickening of the plastic section at such point, by the provision of angular reinforcing sections at the critical points or the provision of internal or external reinforcing strips, either externally or internally in the critical location. Metal reinforcing strips can be used either externally or internally of the elastic or the gauge of sides can be increased in the critical areas to better resist outwardly directed forces applied from the inside tending to expand the walls of the slack chamber outwardly. Such outwardly directed forces applied from the inside might be applied by the force of an expanding service cable loop from the inside of the chamber.

It has also been found that the fairly light polymeric slack chamber and particularly the bottom of such chamber may be knocked crooked or moved in the excavation when the heavy electric service cable is being placed in an excavation and may be knocked out of line by contact with the heavy cable loop. Such heavy electric service cable is commonly 2.5 inch underground service cable such as 500 mcm service cable used broadly for underground service extensions to buildings from underground service and is hard to handle so that bending it into a loop when accomplished manually can appropriately be described as "wrestling" or "manhandling" it into a loop.

In accordance with the invention, and as shown and described in Applicant's earlier patent application, a slack containment enclosure or chamber is made preferably with an internal volume sufficient to contain at least one easily arranged coil of electrical cable with an open top closeable with a cover. The slack chamber is preferably only sufficiently deep to easily contain one or at most several coils of cable containing several feet of the electric cable involved without severe curvature of the cable. Such cable is preferably coiled about but not against a central combined drum or support between the floor of the enclosure and the lid such drum also acting as a strengthening support sufficient together with the remainder of the chamber to support the weight of a man or small machinery when buried. Opposed slots in the side of the chamber at the end and open at the top when the lid is not in place or closed provide for passage through the walls of the chamber of the electrical cable during and after installation and there are preferably open rings or guides accommodated in the slots in the sides through which guides the electrical cable is conducted. The slack chamber of the invention may be constructed of various sturdy structural plastics including the usual or resistant polyvinylchloride composition normally approval for electrical conduit and is extremely easy to install and to coil electrical cable in and close and has solved a serious problem in a simple and cost effective manner. In many cases it will be used with the inventor's improved slip-joint invention for conduit and the following description and explanation as well as the description in the present inventor's previous application for patent provides additional details of the invention.

FIG. 1 is a front elevation of a centrally broken illustration of a general disclosure of a broadly illustrated version of the invention of an underground slack receptacle for use in connection with underground electrical service connection with a building and showing combined with the slack receptacle of the present invention the present Applicant's previous invention of an extensible service connection of a building service box with an underground protective conduit for electrical service cable. In such arrangement a slip joint fitting or assembly 10 is connected to an electrical service box 15 through a screw threaded section or fitting 14 for connecting the upper end of the fitting assembly 10 to the lower end of such electrical service box 15. The connecting fitting 14 is either integrally connected or screw thread connected to the outer member or tube 11 of the slide or slide joint assembly 10. A smaller conduit or tube 30 is partially slid into the lower end of the tube 11 through a resilient gasket, not seen in the figure, which is designed to form a resistant seal between the two slide members 11 and 30 to exclude undesirable wildlife and insects as well as undesirable air flow or the like. As explained in the present Applicant's earlier application during subsidence of the ground level 20 the lower conduit 30 will be pulled downwardly sliding in the gasket within member 11 and will not as a result of such sliding pull down the member 11 or the attached service box 15 with it. Furthermore, because of the smaller outside diameter of the conduit section 30 than the inside diameter of the larger conduit section 11 plus the resiliency of the gasket between these two tubular structures such tubular structures need not be aligned perfectly to enable the smaller to enter into the end of the larger, making it much easier to assemble the sliding fitting or arrangement in the field.

While in the Applicant's previous application, there are also disclosed several embodiments of the outer slip section 11 in which the top is expanded to contain a supply of slack electrical cable for payout in case of ground subsidence, it is difficult to coil and uncoil normal heavy electrical conduit in the constricted space of even a fairly large expansion of the tubular slip member 11. It has become evident, therefore, that a better arrangement would be desirable.

As a result, the present inventor developed an underground slack cable arrangement 40 shown connected to the lower leg of the electrical conduit 41 surrounding the electric service cable, which service cable 39 is seen extending to the right below ground level 20. Due to expansion or sliding of the lower conduit section 30 within the upper conduit section 11 as the ground or any backfill settles, the electric cable 39 within the lower conduit section is in effect pulled or displaced upwardly within the conduit or, more particularly, as the conduit 30 descends with the subsidence of the ground level an additional length of electrical conduit becomes necessary, if the electrical wire or cable is not to be extended and eventually broken or else its connection with the delivery box 15 broken or severed, for there to be slack provided to enable extension of the electrical cable itself over a greater path. In other words, a greater length of electrical cable becomes necessary. In accordance with the present invention such extension is allowed by providing the slack receptacle of the invention with extra or slack cable within it in a manner making such slack cable available for paying out.

Figure 2:
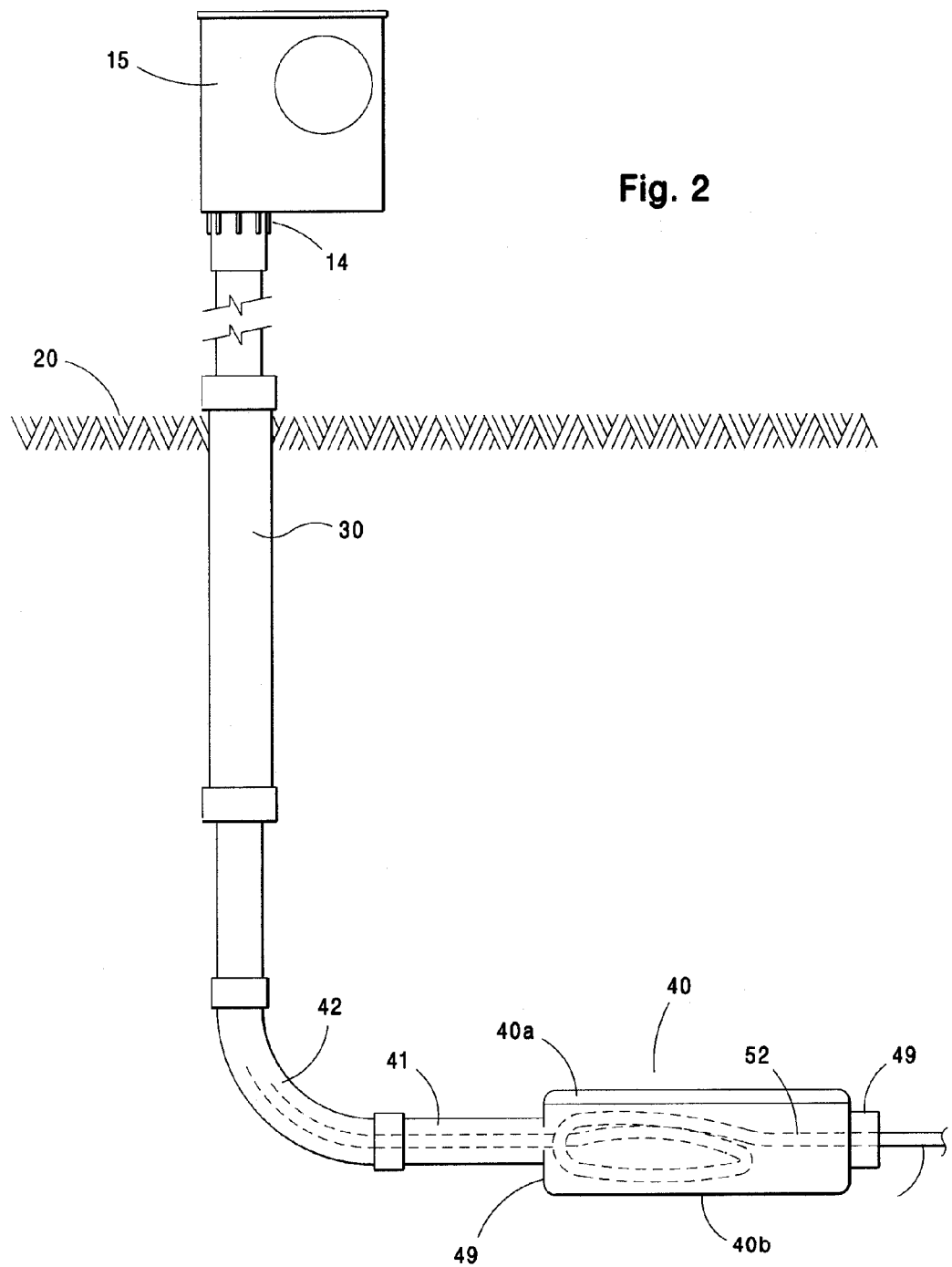
FIG. 2 is a sketch of the use of the slack receptacle of the invention in an installation by itself.

In the present invention, therefore, the necessary slack is provided by the slack receptacle 40 which is preferably positioned on the same level as or at the depth at which the electrical cable itself is buried, normally about three feet deep in order to protect from normal excavation or digging by contractors or gardeners or the like plus heaving and displacement by winter freezing. Such slack receptacle, which is also shown in FIG. 2 and in its preferred form in additional detail in FIGS. 3 through 6 is comprised in its preferred embodiment of preferably a polyvinylchloride or other plastic container-like bottom structure 40*b* with a top 40*a* secured to the upper portion of the bottom structure by suitable fastenings which could be threaded type fastenings but are preferably snap-type or the like fastenings in the preferred case positioned about the central drum to lock the two drum structures together thereby locking the bottom and top of the full slack chamber together. See for example FIG. 3. The top 40*a* should fit fairly tightly upon the bottom structure 40*b* to prevent the percolation of silt carrying moisture or water into the receptacle, although mere moisture is usually not detrimental, since the electric cable is designed to be waterproof in any event by the provision of fairly heavy moisture resistant insulation. At the ends of the receptacle as shown in the figures there are provided cylindrical opening large enough for the passage or entrance of electric service cable or conduit to be easily placed in the container in the form preferably of a single loop 52 within the receptacle exiting the end of the cable receptacle through the opposite orifice. The loop 52 of service cable is formed or made large enough so that it contains sufficient excess cable to be able to pay out enough cable to make up for any subsidence of the ground level from the initial graded ground level, such subsidence being not infrequently from one half to three feet where significant subsidence is encountered. It is desirable that the excess or reserve cable be contained in a single loop, because electric service cable is large cable, normally somewhat over two inches in diameter which does not easily form into or draw out of small loops. While there could be more than one loop if the coil diameter is not excessively constricted an excessive number of closely packed loops is undesirable because of possible excessive electrical induction between the coils. A single loop, however, will experience only a single mild induction effect where the cable crosses which low inductive effect can be ignored so far as any effect on the current is concerned. The orifices 49 in the ends of the receptacle may be provided with resilient gaskets, not shown, sealed in the interior of the cylindrical structure to seal the orifice against the cable to prevent fine silt over time from being carried into the receptacle with entering moisture and possibly interfering with the reduction in size of the loop of cable within the receptacle. Although, as pointed out above, the screening of fine rock particles which is normally laid around and particularly to the sides of the underground conduit will tend to screen the cable and receptacle from larger particles and ground movement, such screening may not be effective in excluding very fine silt which may be carried or percolate with moisture through the screening and find its way into the receptacle effectively surrounding and settling inside the cable loop and over time consolidating sufficiently to substantially immobilize such slack cable loop. Fortunately most subsidence of the backfill around a building is likely to occur within a few months or years of laying the cable so that the loop of slack in the slack receptacle may be expected to be activated prior to any silt load having time to consolidate significantly. However, both the rapidity of subsidence of backfill and the percolation of moisture in liquid form through any crevice or small opening into the receptacle will be dependent in large part upon the amount of rain which is had in any particular period and the time available for consolidation may thus vary considerably.

Rather than providing a resilient tight fitting gasket in the orifices into and out of the receptacle 40, the orifice or orifices 49, after the cable is installed in place may be plugged with a putty composition known as "duct compound" such as is usually used to plug any space about conduits or cable passing into an outdoor service box or through an opening through the wall of a building into the interior. Such duct compound sets up to a fairly well consolidated consistency and will seal the opening quite effectively so long as major movement or payout of the cable through it is not effected. One side of the receptacle will be, as shown, connected to the polyvinylchloride conduit extending via a curved section 42 to the slip arrangement, with the slip fitting assembly 10 secured to the building wall while the exit from the receptacle on the other side will lead either to a further conduit leading to the service supply or, in some cases, simply to a run or stretch of electrical cable laid unprotected in the ground except for the usual "screening" and leading to the service supply point usually referred to as the "street service." As indicated above, the size of the slack receptacle must be large enough to contain essentially a single loop of cable arranged so that it will be easily withdrawable from the receptacle. The maximum single loop content of the receptacle will be attained if an original loop extends from a lower corner of the receptacle to an upper corner or vice versa.

FIGS. 3 through 6 are respectively perspective views of a preferred embodiment of the invention in which the depth of the slack receptacle 40 in this specifically preferred embodiment renumbered as receptacle 78 of the invention is preferably reduced and the exit and entrance orifices 84 and 86 are moved to one side or adjacent one edge of the receptacle as shown. This enables the electrical cable to be passed into one side of the receptacle and looped therein and then passed out the other side without any substantial extra curvature in the cable other than the slack loop itself and, therefore, also makes it easier for the slack contained in the receptacle to be paid out due to tension being placed on the cable as the result of backfill subsidence or the like. One result of the height of the receptacle being decreased is that it better stabilizes the loop 52 in the cable within the receptacle. By positioning the orifice location to one side of the receptacle, or next to one edge of the receptacle, the electrical cable is enabled to extend straight from an external run into the receptacle, curve in a single loop within the receptacle and then without any other bends or curvature other than the central loop curvature plus a straightening at the termination of the loop to extend from the receptacle with only a minor straightening of the electrical cable, thus significantly decreasing the force necessary to extract any necessary slack from the slack receptacle. With the orifices positioned in the center of the sides as shown in some embodiments of the receptacle as in of the invention in Applicant's previous application, on the other hand, the cable requires not only a straightening before leaving the receptacle, but also requires a small but significant reverse bend thus requiring more force to be exerted to extract cable from the receptacle. While this may be desirable where more resistance is desired to prevent undue payout of excess wire or cable this is not usually desirable in an underground environment.

The loop of electrical cable will then upon tension applied to it due to ground subsidence or subsiding of backfill or the like decrease in size paying out slack and might finally even straighten out entirely. However, it would not only be difficult for the cable to straighten out completely because a twist would then have to be absorbed by the cable and there would be a tendency for a small kink to be formed instead, which would be undesirable. Consequently, in order to obtain the amount of slack payout calculated to ordinarily be sufficient, it is desirable or even necessary to design the receptacle to contain a larger loop containing more reserve cable than calculated to be sufficient to allow for or to provide for any extension of the cable required for lengthening of its path due to subsidence of the ground level.

As will be understood, the side extensions or openings through which the cable extends whether from a conduit or direct burial should be sufficiently tight against the opposing member to effectively seal it against the entrance of liquid carried silt or the like. Alternatively, a gasketing or sealant may be applied. A sealant including any hardenable water resistant material may be used, since once the receptacle is positioned in its place it will not be removed or for that matter the receptacle opened again unless service to the cable or the installation of new cable is required. The same is true of any other opening in the receptacle since receptacle is usually applied or installed permanently until some service or repair to the electrical service is required, which should be at fairly infrequent intervals. Such sealing is thus, unlike the gasketing or other sealant, required to seal the space between the cable and the orifices in the receptacle through which it passes, not necessarily resilient.

The receptacle will normally be about 28 inches in length, 18 inches in width and 5 inches high, depending, however, upon the size loop of cable which is desired in the interior. Using the stated dimensions, however, there are a total of 504 square inches or 3.5 square feet of upper, essentially lid, surface exposed to the over burden which may weigh between approximately 600 and 1000 lbs. assuming the receptacle is buried under three feet of earth fairly well saturated with varying amounts of moisture pressing down upon the lid, which is supported only at or around the edges. This places a considerable weight loading upon the lid. In order to aid in supporting such weight, it is desirable to provide a central brace under the center of the lid positioned in the center of the loop. Such brace may be of any shape, such as a crossed structure or may be formed of an appropriate length of the same polyvinyl conduit as used to contain the underground service. Having such brace positioned in the center of the loop of cable within the slack receptacle also has the advantage of providing a minimum to which the loop of cable can be drawn ensuring that forming the loop to a still smaller diameter, possibly causing a kink or the like which may damage the service cable, will not occur. Of course, in calculating the amount of available slack stored in the loop, the circumference of the central preferably smooth round central brace/loop retainer must be subtracted. In the preferred embodiment of the invention the central brace/retainer is formed as an integral portion of the exterior of the receptacle.

It has been found convenient to have the top of the slack receptacle closed by a box-type lid of one kind or another with short flanges all around the sides overlapping with the top of the sides of the chamber. This has been found to be convenient since workers installing the service cable in a trench either in direct burial or indirect burial, i.e. in conduit, usually already installed will be charged with placing the cable loop in the slack chamber as well and such workers typically do not wish to have to fasten the top with threaded fasteners or the like. Having a box-type lid very effectively centers the top on the receptacle and once the excavation is filled holds or maintains the lid or top on the receptacle without specific fastenings. All the installing workers or personnel therefore have to do is to draw out the cable from its coil in whatever packaging it is delivered in, connect it at the street service, run or pull it through whatever conduit is used or, where conduit is not used, lay the cable out in the excavation and when it reaches the slack chamber pass it or lay it with the top off the chamber into the chamber reforming in the slack chamber one of the loops the cable has just been straightened out of in a supply of cable, and the cast of which it "desires" to follow to reform a loop, and then draw the cable out of the chamber on the other side and direct it to the building service. In the event that the slack chamber is provided with slotted openings on the sides into which the service cable can be laid with or without first passing it through a guide for centering in the slot the cable can conveniently be brought into a single coil or loop above the slack chamber and then laid in the slack chamber already looped preferably about a minimum loop drum or centering means. The cable will then conveniently be pressed downwardly into the slack chamber and since the chamber is sturdy the workers will frequently and conveniently press the cable down by stepping or stomping on it so the loop lies uniformly and essentially flat in the slack chamber. Once the coil is securely arranged in the chamber, the lid of such chamber can be merely laid on top and left until the chamber is filled over with about two and a half to three feet of the surrounding ground material often first with a layer or screening of small fractional stone.

FIGS. 3 through 6 show the especially designed and preferred embodiment of the slack chamber of the invention constructed as a two part interfitting case or casing adapted to contain a single loop of electrical cable sufficient to adapt for up to three feet of fill subsidence and providing for the holding of a conventional conduit fitting at either or both ends. An integrally molded central drum also doubles as an integral securing means for the two sections of the casing. No more space is provided within the chamber than actually is necessary to contain the single loop of cable slack and the central drum is large enough to prevent the loop of cable within from reducing too much in diameter which might cause the cable to kink or twist one complete turn for each coil drawn out possibly stressing connections at the service. The shape of the slack chamber on the outside follows generally the interior shape necessary to entertain or accommodate a straight run of overlapping cable in a single loop.

Figure 3:
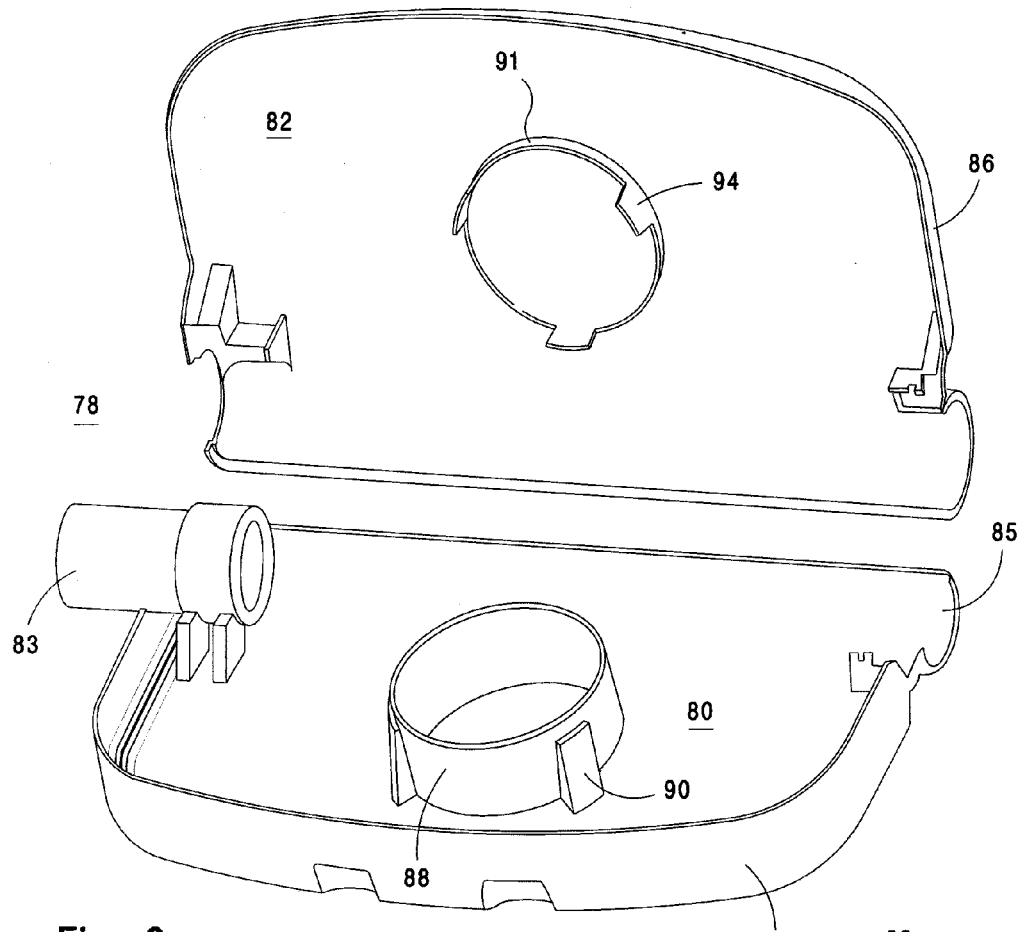
FIG. 3 is a perspective view of a presently preferred molded two section slack chamber casing according to the present invention with the two sections in position to be attached together showing the inside, but before a cable loop is installed therein.
Figure 4:
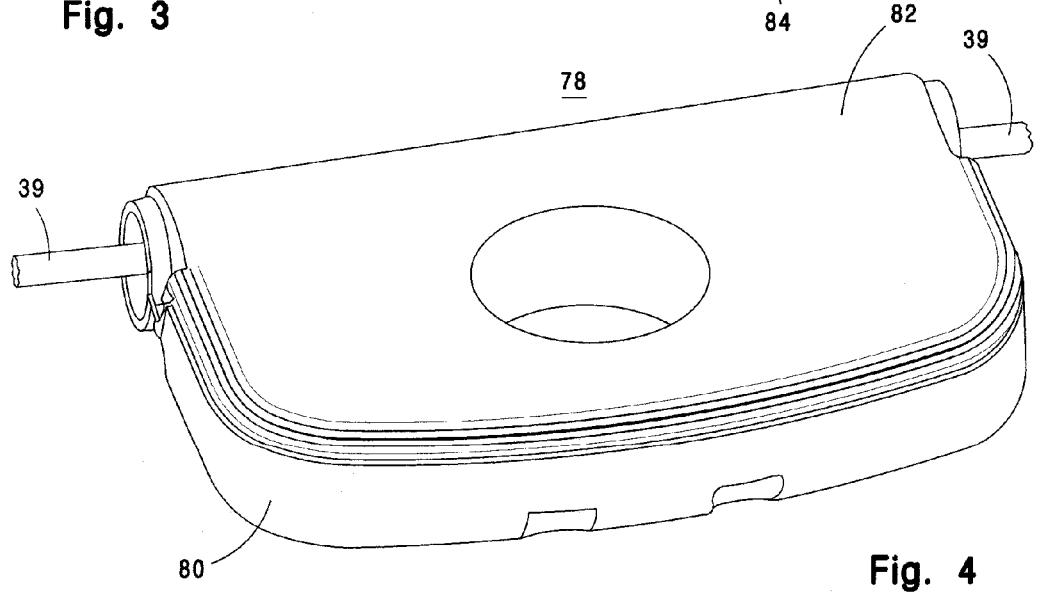
FIG. 4 is a perspective view of the slack chamber casing sections shown in FIG. 3 attached or mounted together with a cable loop within, the view being of the top.

FIG. 3 is a perspective view from the top and away from the loop side of a preferred slack chamber with the bottom section or casing 80 resting on a surface, such as, for example, the bottom of a cable excavation, not shown, and the top section or casing 82 held slightly above in an open position. The bottom casing has an outer side wall 84 which extends completely about the bottom casing section and the top 82 has a matching sidewall 86 somewhat smaller in overall depth or dependent dimensions but having an outwardly expanded flange 87 which, when the top 82 and bottom 80 casings, are brought together, fits over the edge or flange of the bottom casing as seen more particularly in FIG. 4. There may be a smaller flange or ledge, not shown, spaced inwardly of the outer flange to encompass the opposite end of the lower section. A central round or generally curvilinear hub 88 extends upwardly from the bottom casing 80 and has several outward expansions 90 which provide undercut sections 92, seen best in FIG. 5, which figure is a view of the inside of the bottom casing 80 with a loop 52 of electric cable or conduit 39 in place. When the top section or casing 82 is brought down upon the bottom section or casing 80 with the two fitting together as shown in FIG. 4 detents 90 pressed out of or outwardly of the central ring wall or hub 88 of bottom casing 80, contact or surround flexible detents 94 dependent from a short flange 91 in top casing 82, when the top casing 82 is closed upon and fitted upon bottom casing 80, and by spring or resilient action lock onto the matching outer extensions 90 on the central hub wall 88 effectively securing the top and bottom casings 82 and 80 respectively together. When it is desired to remove the top casing 82 from the bottom casing 80, one can reach into the open hub and pull the detents 94 outwardly. The same procedure can be used to bring the two casings together with the top ring within the lower casing ring after which the detents can be released and will spring into position within the outward expansion 90. Three detents 94 may be supplied, but, if one is removed, opening or pulling such detents away from the central bottom hub casing with only two hands or the fingers of two hands is facilitated. If such detent is not removed or broken away or one of the detents is not omitted initially, two persons may have to release the detents to bring the two casings together. It will be noted in FIG. 3 that one of the three detents 94 has been partially removed. The central hub 88 on the bottom casing extends into contact with the upper casing 82 by sliding thereover when the two casings are closed together and provides vertical and lateral strength and stiffness to resist the load of the overburden and other vertical loads when the closed casing is in place.

Figure 5:
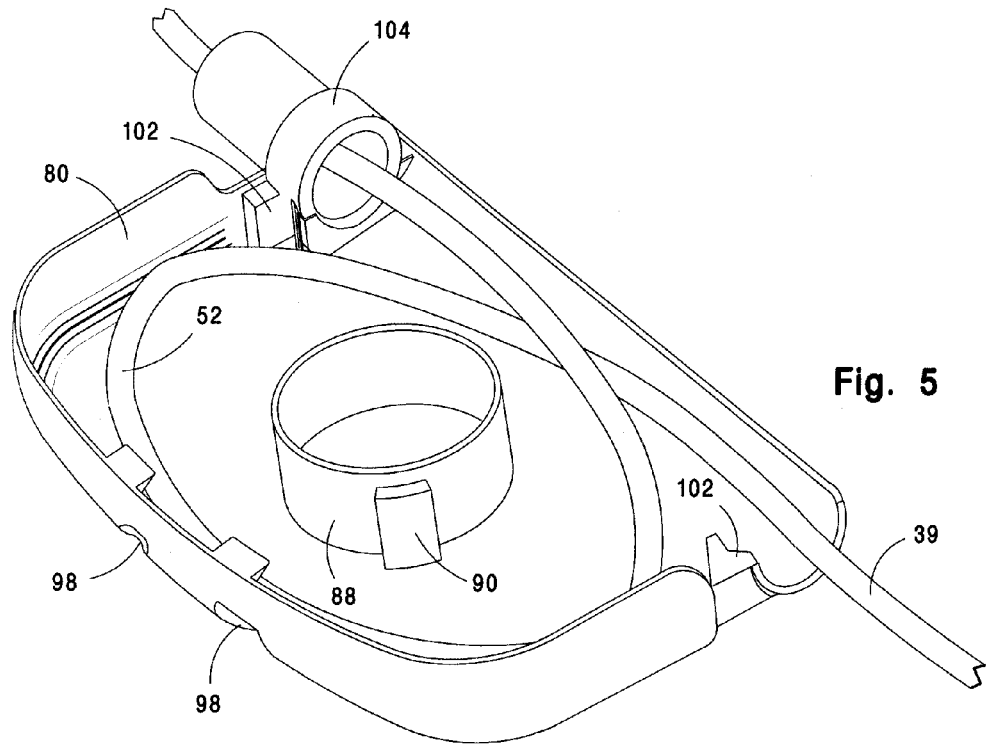
FIG. 5 is a perspective view of the lower portion of the slack chamber casing with a cable loop therein.
Figure 6:
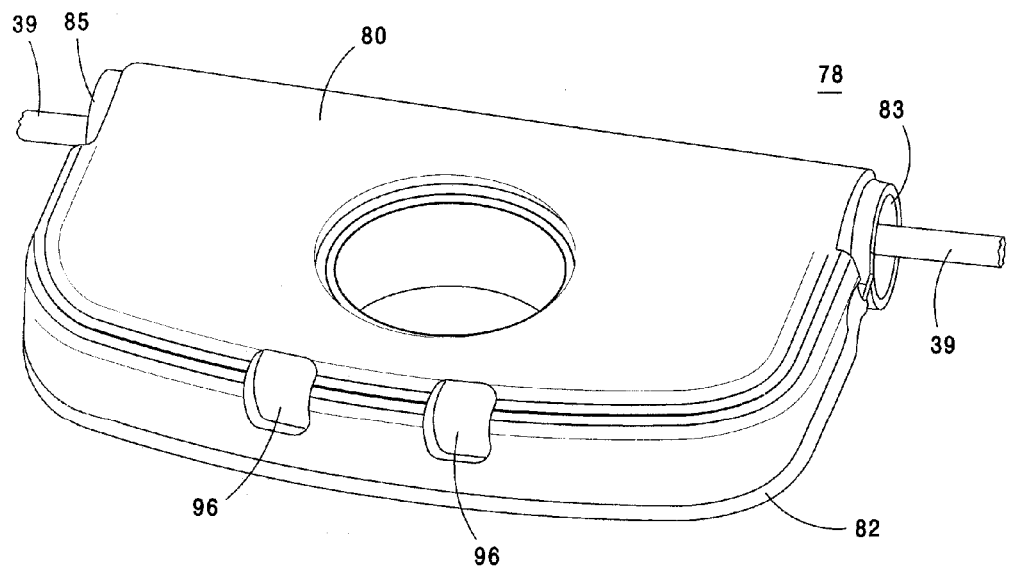
FIG. 6 is a perspective view of the closed slack casing with a loop of cable therein taken from the bottom side.

FIG. 6 is a bottom view of the slack chamber 78 showing the cable 39 exiting from both ends 83 and 85 of the combined casings. Two pressed in portions 96 can be seen at the near side with sections of the electric service cable visible through such pressed out (or in) portions. FIG. 5 shows the inside of the bottom section or casing and it can be seen that pressed in or molded detent sections serve as detents or guide sections 98 to keep the cable loop from rotating upwardly when the casing is open. It will be understood that although the pressed out portions 96 leave openings in the plastic wall of the casing, such openings are in the lower portion of the slack chamber and in effect serves as a drain for water and silt that may gain entrance plus the decreased volumetric capacity of the slack chamber embodiment shown in FIGS. 3 to 6 tends to limit the inflow of silt laden moisture to the slack chamber such that locking up of the slack loop of the cable 39 by consolidated silt is unlikely to occur during the period of likely subsidence of the usual backfill material in new construction. Where experience indicates that difficulty with silting up of the slack chamber may be encountered the openings or orifices can be closed as explained earlier by the application of so-called "duct compound." The curvilinear design of the casing adds rigidity and strength to the closed casing.

At the ends of the slack chamber on both the top and bottom casings there are molded a series of inwardly projecting detents and/or molded sections 102 adapted to retain between the top and bottom casings at the entrance and "exit" or two cable openings 83 and 85 of the combined casings standard electrical conduit connectors or sleeve fittings. Such sleeve connectors or fittings can be applied to the electric conduit cable before the formality of locking together the top and bottom sections and the fitting then placed in the position where it will be secured by the closing of the two casings together. It can be held in such area temporarily by narrow strapping for initial passage of the cable through and then when the top casing is placed in or closed upon the bottom casing will be securely grasped or held between the casings. If a conduit is to be used on only one side of the slack chamber the other side can be merely left open with the cable passing through the opening. Alternately, a conduit fitting may be placed at the exit from the closed casing with the fitting unconnected to any conduit, but the electrical cable passing through the fitting. The clearance between the fitting and the electrical cable can be closed with a closure material such as duct compound or the like.

While polyvinylchloride material of various analysis are usually specified for electrical conduit and particularly for applications where some electrical connections are made, no electrical connections are normally made in the slack chamber of the invention and in addition since it is used underground any supply of oxygen which might support combustion is rather severely limited. Thus, there is little if any fire hazard and it is not believed fire resistance should be a significant factor unless the slack chamber was to be used above ground level in which case the preferred material of construction would be one of the fire resistant compositions of PVC. A preferred composition for the molded embodiment of the invention shown in FIGS. 3 through 6 is presently polyethylene containing about 20% by weight of glass spheres or the like. The preferred dimensions are about 28 long by 18 inches wide and between 4 and 4.5 in thickness or height, but other sizes could be made and used particularly if larger loops of cable are desired for greater expected or possible ground subsidence.

Figure 7:
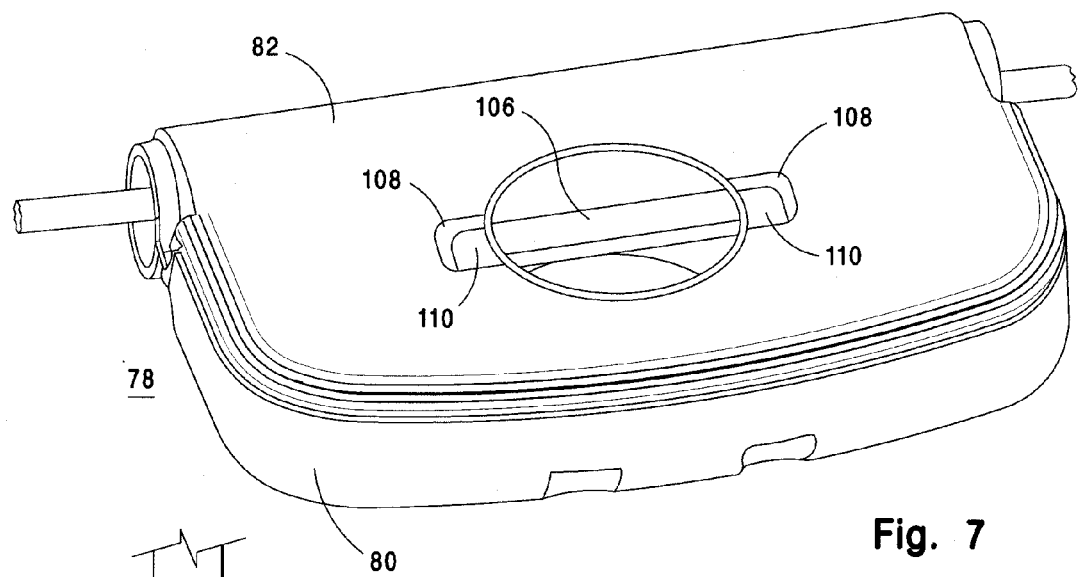
FIG. 7 is a perspective view of an improved top to the slack chamber.

FIG. 7 is a perspective upper view of an improved top to the slack chamber 78 of the invention wherein the downwardly extending flange is longer and such additional length has been taken advantage of to add a cross handle 106 by which a complete locked together slack chamber may be readily carried. The cross handle also reinforces the center hub of the slack chamber and the increased rigidity has been taken advantage of to provide end orifices 108 into which two sturdy flexible latches 110 extending upwardly from the central hub in the lower section of the slack chamber may be received and locked. Such latches are easily released by the user of the slack chamber by inward pressure applied to the end latch toward the center of the top.

The slack receptacle of the invention can be placed in the center of or partway through a run of underground conduit protecting electric service wire or can be placed at the end of such protective conduit where the service cable continues outward to a service pole or distribution point. If the slack receptacle is in the center of a run of conduit it may not be necessary to seal the orifices in it leading to such conduit, but, as explained, it is desirable to seal any openings leading directly to the underground surroundings to prevent the accumulation of materials in the receptacle that may immobilize or partly immobilize the cable and prevent slack from being paid out. Because of the relatively restricted design of the embodiment shown in FIGS. 3 through 6 which is a preferred design, the exclusion of outside moisture with a possible damaging load of silt or the like may not be as important.

In general, it is preferable to use the slack casing or chamber of the invention as close to where initial tension from ground subsidence will initially occur, since the considerable residence to paying out of slack cable may occur even when such cable is snaking through a conduit and if such cable is direct buried it will be essentially immobilized within a few inches. Thus, it is preferable for the slack casing or chamber of the invention to be positioned or to be placed as close to the building service as possible usually immediately after the usual curved conduit section leading an electric service from a vertical downward orientation to a horizontal run to street service.

As will be evident from the above, the present Applicant's invention solves a significant problem in the electrical power and building industries for which no practical remedy has heretofore been suggested or even in some cases recognized. Furthermore, the invention is both relatively inexpensive and easy and convenient to implement as well as being highly effective for its purpose.

As will be also readily recognized, the slack chamber invention of the present application provides a convenient and effective solution of a serious problem with ground subsidence. In addition, the fittings of the two related inventions of the present inventor when used together as shown in FIG. 1 provide the adjustability necessary to allow the electrical service to a building to be readily connected while allowing complete and continuous shielding of the electric cable yet allowing for sinking of the fill around a building structure without pulling the electric service lines loose form the building or exposing such service lines to possible contact with the elements, or weather, or persons who may be in the vicinity. The slack adjuster portion of the combined invention provides a very neat solution to the problem of having insufficient slack in the service cable extending to a building to allow for substantial settlement of backfill around such building in which underground service cables are buried. While the invention has not been tried for used in earthquake zones, it is also believed it may limit damage to underground electric service during relatively severe earthquakes and the like when due to shocks and movements in the ground underground service lines may be broken or otherwise seriously damaged. As will be recognized, the construction of the slack receptacle of the invention is such that it can payout slack in a service installation substantially instantaneously to adjust to the sudden and sever tension in electrical wires which frequently occur during severe earthquakes.

Figure 8:
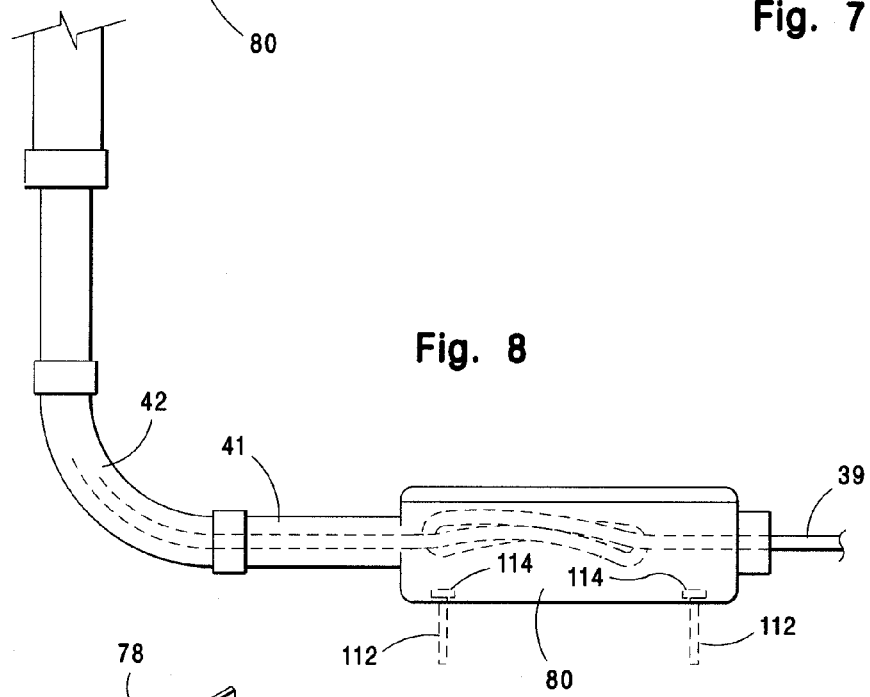
FIG. 8 is a sketch of the use of an improved embodiment of the slack chamber of the invention.

Another problem that is encountered by the electric lineman who usually installs the heavy cables in prepared trenches for underground service cables and therefore also the slack boxes of the invention is that when the bottom of the chamber is positioned in the trench and the heavy cable is wrestled into it the chamber, or more correctly the bottom of the chamber, such bottom being fairly light may be easily displaced by the cable loop being placed into it or may even be displaced after the cable is placed into it by contact with the cable. In other words, the bottom of the chamber is first positioned in the bottom of the excavation where it is desired for it to be when a lineman is trying to form and place a loop of heavy cable into it is made from the fairly light plastic section which light plastic may be easily pushed or knocked to another position by first contact with the cable, making it difficult and even precarious to place or drop the loop of heavy cable within the bottom sections. This problem can be solved it has been found, however, by providing spikes through the bottom of the chamber to stabilize it in place while placing a cable loop within it. This is shown in FIG. 8 where a bottom portion 80 of a slack chamber is shown positioned in a trench preparatory to placement of a loop of service cable within it. Positioning spikes 112 can be seen in dashed lines extending downwardly into the soil or fill forming the base of the trench. Preferably, the spike has a head 114, which is larger than the opening in the bottom of the slack chamber. The spikes, which will preferably be also formed from a polymeric composition, can be left in place to further stabilize the slack chamber against movement if ground settlement occurs and aid in making certain that the loop of cable is free to be pulled out to protect the electric service on the wall of a building.

Figure 9:
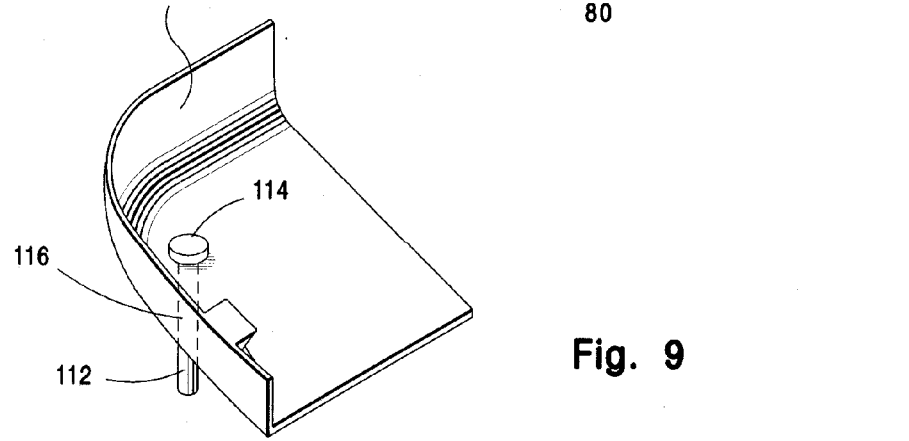
FIG. 9 is a perspective view of the lower portion of the slack chamber of the improved embodiment of the slack chamber of the invention shown in FIG. 7.

An improvement in the use of the spikes shown in FIG. 8 is shown in FIG. 9 which is an oblique section of one inside portion of the slack chamber 78 of the invention having a molded in tubular downwardly directed passageway 116 extending from partway up the inside wall and designed for the retention of a strong plastic spike during storage of the slack chamber prior to use but drivable by appropriate pressure or blows through the bottom of the chamber and into the fill below to hold the lower portion of the slack chamber in position while placing a loop of heavy service strand in it.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A hollow casing for storing slack heavy exterior electric service cable for payout in case of ground subsidence to prevent damage of building service to which the cable is connected said slack cable casing comprising:
   (a) separate cooperating top and bottom sections defining an internal configuration and volume such as to store at least a single loop of heavy exterior electrical service cable in a condition in which such cable is readily withdrawable from the casing upon tension being applied to the cable from outside the casing as a result of tension engendered by earth movement,
   (b) the construction of said casing being such as to resist a weight applied to the casing equivalent to the weight of several feet of earth and rock plus normal above ground objects and personnel,
   (c) two opposed notch shaped openings in opposite sidewalls of the bottom section of the casing for free passage of the cable through at least one of such openings when the top and bottom sections of the hollow casing are assembled together,
   (d) the assembled casing being wider and longer than it is high by a significant ratio,
   (e) a central reinforcing member mounted in the bottom section of the casing such as to reinforce the hollow casing in its narrowest dimension by contact with the top section when the top and bottom sections are closed and when disposed underground and further serving as a central cable loop stabilization member,
   (f) such central reinforcing and cable loop reinforcing means having a diameter less than half the side to side dimension of the hollow casing and biased to one side of the hollow casing close to a direct line between the two opposed openings in the side of the assembled casing,
   (g) the opposed openings in the side walls of the bottom section of the hollow casing being unrestricted toward the open side of the bottom section when the top of the casing is removed from the bottom allowing convenient formation of a loop of exterior building service cable above the bottom section of the hollow casing with the top removed and placement thereof in one half of the casing with the ends of such loop extending in opposite directions from the body of the casing and allowing the two halves of the casing to be recombined about the heavy exterior cable,
   (h) the cooperating top and bottom sections fitting together in box top fashion with flanges on one extending alongside walls of the other.

2. The hollow casing in accordance with claim 1 wherein the bottom section is provided with detents on at least one interior side extending inwardly to deter a loop of electric cable from riding upwardly along the side and extending over the top of the side thereby preventing the top section from being positioned upon the bottom section.

3. The hollow casing in accordance with claim 2 wherein the openings in opposite sidewalls are adjacent one wall or side of the casing.

4. The hollow casing in accordance with claim 2 wherein the one side of the reinforcing and loop dimension stabilization means is in line with the opposed openings in opposite sides of the casing.

5. The hollow casing in accordance with claim 4 wherein the casing is formed of two more or less equal halves in linear and transverse dimensions which halves snap together.

6. The hollow casing in accordance with claim 1 being formed in a curvilinear configuration thereby providing increased structural rigidity.

7. The hollow casing in accordance with claim 6 wherein detents for the two halves are provided on two interfitting central loop dimension minimizing structures.

8. The hollow casing in accordance with claim 7 wherein the casing is positioned underground not less than several feet below ground level and receives a conduit leading from an electric building service and is connected by cable on the opposite side extending underground to street service and the casing is horizontally oriented.

9. The hollow casing in accordance with claim 1 wherein said casing is buried at the end of a conduit leading from an electrical service means on a building wall.

10. The hollow casing in accordance with claim 1 wherein the casing is buried in a vertical position at least partially underground and attached to a building below the building service through a conduit.

11. The hollow casing in accordance with claim 1 wherein said cooperating top and bottom sections of the casings include retention means for retaining when the top and bottom sections are assembled together flanges for electrical conduit and thereby electrical conduit integral with such flanges.

12. A method of preventing damaging tension from being applied to a building electric service from buried heavy exterior electrical service lines as a result of fill subsidence adjacent the building upon which said building electrical service is mounted comprising:
  (a) at the time of installing an underground service line providing a hollow two part slack chamber buried at least partially below ground level in general line with the underground service line,
  (b) before the underground service line is connected to the building electric service opening the incompletely buried slack chamber,
  (c) at the time of connecting the electric service line to the electric service, forming a full loop in the service line and depositing said loop in one section of the open slack chamber with the ends extending from opposite sides of the slack chamber,
  (d) closing the slack chamber,
  (e) completing at least partial burial thereof and completing connection between the building service and street service,
  (f) retaining said loop in the loop in the slack chamber until ground subsidence results in exterior tension upon the cable and results in sufficient tension upon the cable within chamber to withdraw at least some of the cable from the chamber thereby relieving such tension,
  (g) the maximum withdrawal of cable from the slack chamber being governed by a central loop stabilization member about which the cable is looped within the slack chamber, and
  (h) wherein before forming the full loop in the service line and depositing said loop in one section of the open slack chamber, stabilizing at least the lower section of the two part slack chamber with respect to the ground underneath by passing one or more sharpened members through orifices in the lower section of the slack chamber into the ground below.

13. A method of prevention of damaging tension in building electric service in accordance with claim 12 in which the slack chamber is provided in a portion of an underground service connection excavation in line with the run of an underground electric service cable and the sharpened members pass through elongated channels in the slack chamber.

14. A method of prevention of damaging tension in building electric service from heavy exterior electric service lines in accordance with claim 13 wherein when installing an underground service line the slack chamber is buried near the end of the heavy service line which is being installed underground and, with the top of the slack chamber open, a loop is formed in the underground service line and deposited in the slack chamber with the top open with sections of the cable extending from orifices in both sides of the slack chamber, the top of the slack chamber is then replaced in a closed configuration and the slack chamber is thereafter buried with the service line.

15. A method of preventing damaging tension in heavy service line in accordance with claim 14 in which the loop in the service cable is deposited over a central reinforcing and stabilization member extending in close contact with the top and bottom of the slack chamber when closed and considerably smaller in diameter than the loop when installed in the slack chamber, but generally defining the amount of slack cable provided in the slack chamber and the general position of the loop in the slack chamber.

* * * * *